United States Patent
Martens et al.

[11] Patent Number: 5,878,495
[45] Date of Patent: Mar. 9, 1999

[54] METHOD OF MANUFACTURING A DYNAMIC GROOVE BEARING BY MEANS OF A METAL-REMOVING TOOL, AND DATA STORAGE UNIT PROVIDED WITH SUCH A DYNAMIC GROOVE BEARING

[75] Inventors: Peter Martens; Johannes C. Driessen, both of Eindhoven, Netherlands

[73] Assignee: U.S. Philips Corporation, New York, N.Y.

[21] Appl. No.: 627,619

[22] Filed: Apr. 4, 1996

[30] Foreign Application Priority Data

Apr. 6, 1995 [EP] European Pat. Off. .............. 95200871

[51] Int. Cl.$^6$ .................................................. B23P 13/04
[52] U.S. Cl. .................................. 29/898.057; 29/898.13
[58] Field of Search ............................... 29/898, 898.042, 29/898.057, 898.041, 557, 558, 898.13

[56] References Cited

U.S. PATENT DOCUMENTS 4,380,355  4/1983  Beardmore ............................... 384/123

FOREIGN PATENT DOCUMENTS

0574074A2  12/1993  European Pat. Off. ........ G11B 23/00

*Primary Examiner*—Charles A Marmor
*Assistant Examiner*—Matthew A. Kaness
*Attorney, Agent, or Firm*—Daniel E. Tierney

[57] ABSTRACT

A method of manufacturing a dynamic groove bearing having parts rotatable relative to one another. The bearing parts include cooperating bearing surfaces and a pattern of grooves by means of a metal-removing tool. A first bearing part is fastened to a rotatable support of a machine tool, which is rotated in a constant direction. The tool is periodically displaced relative to the first bearing part parallel to a direction transverse to the bearing surface of the first bearing part by a positioning device with a frequency which is determined by a product of a rotation frequency of the support and a number of grooves on the bearing surface of the first bearing part. The tool is periodically displaced in a sinusoidal movement and the positioning device may include a piezoelectric actuator (95). A data storage unit including dynamic groove bearings is also provided.

13 Claims, 6 Drawing Sheets

METHOD OF MANUFACTURING A DYNAMIC GROOVE BEARING BY MEANS OF A METAL-REMOVING TOOL, AND DATA STORAGE UNIT PROVIDED WITH SUCH A DYNAMIC GROOVE BEARING

BACKGROUND OF THE INVENTION

1. Field of the Invention

The invention relates to a method of manufacturing a dynamic groove bearing with a first and a second bearing part which are rotatable relative to one another, by which method die bearing parts are provided with cooperating bearing surfaces and the bearing surface of the first bearing part is provided with a groove pattern by means of a metal-removing tool, for which purpose the first bearing part is fastened to a rotatable support of a machine tool, and the metal-removing tool and the first bearing part are displaced relative to one another boy a positioning device of the machine tool while the support is rotating.

The invention also relates to a data storage unit with an information disc and a scanning unit for cooperation with the information disc, which information disc is rotatably supported in a cassette-type housing by means of two dynamic groove bearings provided with spherical bearing surfaces, which housing has two main walls extending parallel to and on either side of the information disc, while an external bearing part of each of the two dynamic groove bearings is fastened to a respective main wall.

2. Description of the Related Art

According to a generally known method of the kind mentioned in the opening paragraph for manufacturing a dynamic groove bearing, the dynamic groove bearing is provided, for example, with a spiraling groove pattern which comprises a number of spiraling grooves provided with equal interspacings, or with a herringbone groove pattern which comprises a number of pairs of grooves arranged in a V-shape with equal interspacings. The metal-removing tool used in the known method is a cutting tool which carries out a number of consecutive planing operations on the first bearing part. During an individual planing operation, the rotatable support with the first bearing part carries out an oscillatory rotational movement and the cutting tool carries out an oscillatory translatory movement such that the cutting tool is repeatedly displaced relative to the first bearing part in accordance with a path which correspondings to an individual groove The individual grooves of the groove pattern are thus consecutively provided in the first bearing part by the known method. The individual grooves formed in this way in general have a constant rectangular cross-section.

A disadvantage of the known method is that the method is time-consuming owing to the oscillatory movements of the support and the cutting tool. Said oscillatory movements have a comparatively high amplitude and a comparatively low frequency because the tool is displaced relative to the first bearing part along the fill length of an individual groove each time, and because the support and the cutting tool are brought to a halt each time in the reversal points of their oscillatory movements and subsequently are accelerated in the reverse direction. In addition the cutting tool cuts in one direction of its oscillatory movement only and is not in contact with the fist bearing part in the reverse direction of its oscillatory movement. A further disadvantage of the known method is that the grooves can be provided with non-constant cross-sections or cross-sections differing from a rectangular shape such as, for example, semicircular cross-sections with great difficulty only, or perhaps even not at all.

SUMMARY OF THE INVENTION

It is an object of the invention to provide a method of the kind mentioned in the opening paragraph with which the above disadvantages of the known method are avoided as much as possible.

The invention is for this purpose characterized in that the support is rotated in a constant direction, while the metal-removing tool and the first bearing part are periodically displaced relative to one another parallel to a direction transverse to the bearing surface of the first bearing part with a frequency which is determined by a product of a rotation frequency of the support and a number of grooves to be provided on the bearing surface of the first bearing pan. Since the support with the first bearing part is rotated in a constant direction, the metal-removing tool and the first bearing part are displaced relative to one another along a path which crosses the grooves of the groove pattern to be provided in succession. Since the metal-removing tool and the first bearing part are periodically displaced relative to one another parallel to a direction transverse to the bearing surface of the first bearing part with a frequency which is determined by a product of the rotation frequency of the support and a number of grooves to be provided on the bearing surface of the first bearing part, the metal-removing tool carries out a short chiselling movement each time while crossing the consecutive grooves to be provided, so that a comparatively small portion of the consecutive grooves is preprocessed or further deepened each time. The grooves of the groove pattern are thus simultaneously formed during the rotation of the support. The periodic movement of the metal-removing tool and the first bearing part relative to one another has an amplitude which is determined by a depth of the grooves to be provided. Since said depth is compara-tively small, said amplitude is comparatively small, and a comparatively high frequency of the periodic movement of the metal-removing tool and the first bearing part relative to one another is achievable, so that also a comparatively high rotation frequency of the support wilt the first bearing part is achievable. Owing to the high rotation frequency of the support with the first bearing part and the comparatively high frequency of the periodic movement of the metal-removing tool and the first bearing part relative to one another, a comparatively high processing speed is achieved, so that the dynamic groove be is manufactured in a com-paratively short time by a method according to at invention.

The grooves of the dynamic groove bearing manufactured by a method according to the invention have a cross-section which is determined by a change in the position of the metal-removing tool relative to the bearing surface during a single cycle of the periodic movement of the tool and the first beg part relative to one another. Since the change in said position can be controlled in that the positioning device is suitably controlled, the dynamic groove bearings to be manufactured by a method according to the invention can be provided with grooves having various cross-sections such as, for example, semicircular, elliptical, or parabolic cross-sections. In addition, a dynamic groove bearing to be manufactured by a method according to the invention may be provided with grooves having non-constant cross-sections or grooves with mutually differing cross-sections.

It is noted that the position of the tool relative to the first bearing part during a single cycle of such a periodic move-ment will in general change gradually because the driving forces exerted by the positioning device on the tool or on the support with the first bearing part are of a limited value. As a result of this, the grooves of the dynamic groove bearings manufactured by a method according to the invention have side walls which extend obliquely, i.e. not perpendicularly relative to the bearing surface and which merge fluently, i.e. without sharp angles, into the portions of the bearing surface situated between the grooves and into the bottoms of the grooves. The cross-section of the grooves thus manufactured accordingly differs significantly from the rectangular cross-section of the grooves manufactured by the know method described above, where a clear-cut, sharp, angled transition between the bearing surface aid the grooves is obtained. Such sharp, angled transitions between the bearing surface and the grooves are characteristic of conventional dynamic groove bearings and lead to a comparatively high pressure in the grooves during stationary operation and to a comparatively high supporting force of the dynamic groove bearing. Said sharp, angled transitions cannot be achieved by the method according to the invention. It was found, however, that a fluent transition between the side walls of the grooves and the bearing surface achieved by a method according to the invention leads to a comparatively fast pressure build-up between the bearing surfaces of the two bearing parts during staring of the dynamic groove bearing, while said fluent transition causes no more than an admissible reduction in the support force dams stationary operation. Owing to said fast pressure build-up, the bearing surfaces of the two bearing parts become detached from one another more quickly during starting of the groove bearing, so that mechanical friction between the be surfaces and wear of the bearing surfaces caused thereby are limited as much as possible during starting of the groove bearing.

It is noted that a method of manufacturing a dynamic groove bearing is known from U.S. Pat. No. 4,380,355. According to this method a bearing surface is provided with grooves of rectangular cross-section by means of an etching process, after which portions of the bearing surface present between the grooves are provided with a somewhat convex surface by means of a polishing cloth. This known method thus comprises two different operational steps for providing the grooves and processing the portions of the bearing surface present between the grooves, and is accordingly, time-consuming. The groove bearings manufactured by this known method also exhibit the usual sharp, angled transition between the grooves and the bearing surface.

A special embodiment of a method according to the invention is characterized in that the metal-removing tool and the first bearing part are periodically displaced relative co one another parallel to the direction transverse to the bearing surface of the first bearing part in accordance with a sinusoidal movement. A dynamic groove bearing is manufactured by this special embodiment of a method according to the invention which is provided with grooves of a sinusoidal cross-section, while also the portions of the bearing surface present between the grooves have a sinusoidal surface. The driving forces to be exerted by the positioning device on the tool or on the support with the first bearing part for manufacturing such bearing surfaces with sinusoidal grooves are minimal, so that a maximum frequency of the periodic movement of the tool and the first bearing part relative to one another is achievable. A maximum number of grooves is thus provided in the bearing surface, given a certain rotation frequency.

A further embodiment of a method according to the invention is characterized in that the bearing parts are provided with spherical bearing surfaces, the metal-removing tool and the first bearing part being periodically displaced relative to one another parallel to a direction which is oblique to an axis of rotation of the support. In this further embodiment of a method according to the invention, a dynamic groove bearing is manufactured which generates a beard force directed perpendicularly to an axis of rotation of the groove bearing as well as a bearing force directed parallel to the axis of rotation of the groove bearing. In this further embodiment, the groove pattern is provided either on the convex bearing surface of an inner bearing part of the dynamic groove bearing or on the concave bearing surface of an outer bearing part of he dynamic groove being. Since the tool and the first bearing part are periodically displaced relative to one another parallel to a direction which is oblique relative to an axis of rotation of the support with the first bearing part, a comparatively great portion of the spherical bearing surface of the first bearing part can be processed by the tool with a constant angle being enclosed between the axis of rotation of the support and the direction of the mutual periodic displacement of the tool and the first bearing part. The direction of the mutual periodic displacement of the tool and the first bearing pan thus need not be changed during the manufacture of the dynamic groove bearing.

A yet further embodiment of a method according to the invention is characterized in that the metal-removing tool and the first bearing part are periodically displaced relative to one another parallel to the direction transverse to the bearing surface of the first bearing part by means of a laminated piezoelectric actuator. Such a laminated piezoelectric actuator is eminently suitable for generating displacements having a frequency and amplitude which are characteristic of the manufacture of dynamic groove bearings by a method according to the invention. The amplitude of said displacements is determined by the depth of the grooves to be manufactured and is, for example, a few tens of micrometers, while the frequency of said displacements, which is determined by the product of the rotation frequency of the support and the number of grooves to be provided on the bearing surface of the first bearing part is, for example, a few hundred Hertz. In addition, very accurate displacements are achievable by means of such a piezoelectric actuator. Not only do The grooves of the manufactured dynamic groove bearing have an accurate shape as a result of this, but the mutual dimensional deviations of the portions of the bearing surface present between the grooves are also comparatively small. The risk of mechanical contact between the bearing surfaces of the bearing parts in the case of small gap heights between the bearing surfaces is reduced thereby, so that comparatively small gap heights and accordingly a high stiffness of the dynamic groove bearing are achievable, A particular embodiment of a method according to the invention is characterized in that the metal-removing tool is fastened to a tool holder of the positioning device which tool holder is fastened to a housing of the positioning device by means of two elastically deformable, annular membranes which extend perpendicularly to a line of force of the piezoelectric actuator and which have a common centerline which coincides with the line of force of the piezoelectric actuator. The use of the annular membranes leads to a fastening of the tool which is particularly stiff in a direction perpendicular to the line of force of the piezoelectric actuator. Mechanical vibrations of the tool and a mechanical load on the piezoelectric actuator in a direction perpendicular to the line of force of the piezoelectric actuator occurring under the influence of processing forces are avoided as much as possible thereby.

A further embodiment of a method according to the invention is characterized in that the membranes are coupled to one another by means of a coupling bush which is concentrically positioned relative to the line of force and which forms part of the tool holder, while the piezoelectric actuator is bush-shaped and positioned concentrically within the coupling bush, an axial position of the metal-removing tool directed parallel to the line of force being measured by a position sensor which is arranged inside the bush-shaped piezoelectric actuator and which detects an axial position of the tool holder directed parallel to the line of force. The use of said coupling bush and bush-shaped piezoelectric actuator in which the position sensor is arranged provides a particularly compact construction of the positioning device. Since the positioning sensor detects the axial position of the tool holder, moreover, a particularly accurate measurement of the axial position of the metal-removing tool is provided which is not influenced by deformations of the piezoelectric actuator or the coupling bush.

A data storage unit of the kind mentioned in the preamble is known from EP-A-0 574 074. The known data storage unit has a very compact, light-weight and convenient construction with minimum dimensions, so that the data storage unit can be constructed in pocket size. Tile dynamic groove bears used ill the known data storage unit accordingly are of minimum dimensions. To achieve a long and maintenance-free life of the data storage unit, it is necessary for the dynamic groove bearings to have an accurate gap height between the spherical bearing surfaces.

The data storage unit according to the invention is characterized in that the dynamic groove bearings are manufactured by a method according to the invention. Since the dynamic groove bearings manufactured by the method according to the invention have a high dimensional accuracy while in addition comparatively short processing times are achievable which are necessary for mass manufacture of such compact data storage units, the method according to the invention is eminently suitable for manufacturing the dynamic groove bearings required for said data storage unit.

BRIEF DESCRIPTION OF THE DRAWINGS

The invention will be explained in more detail below with reference to the drawings in which:

FIG. 3b shows an inner bearing part with a groove pattern belonging to the dynamic groove bearing of FIG. 3a.

DETAILED DESCRIPTION OF THE PREFERRED EMBODIMENTS

Figure 1:
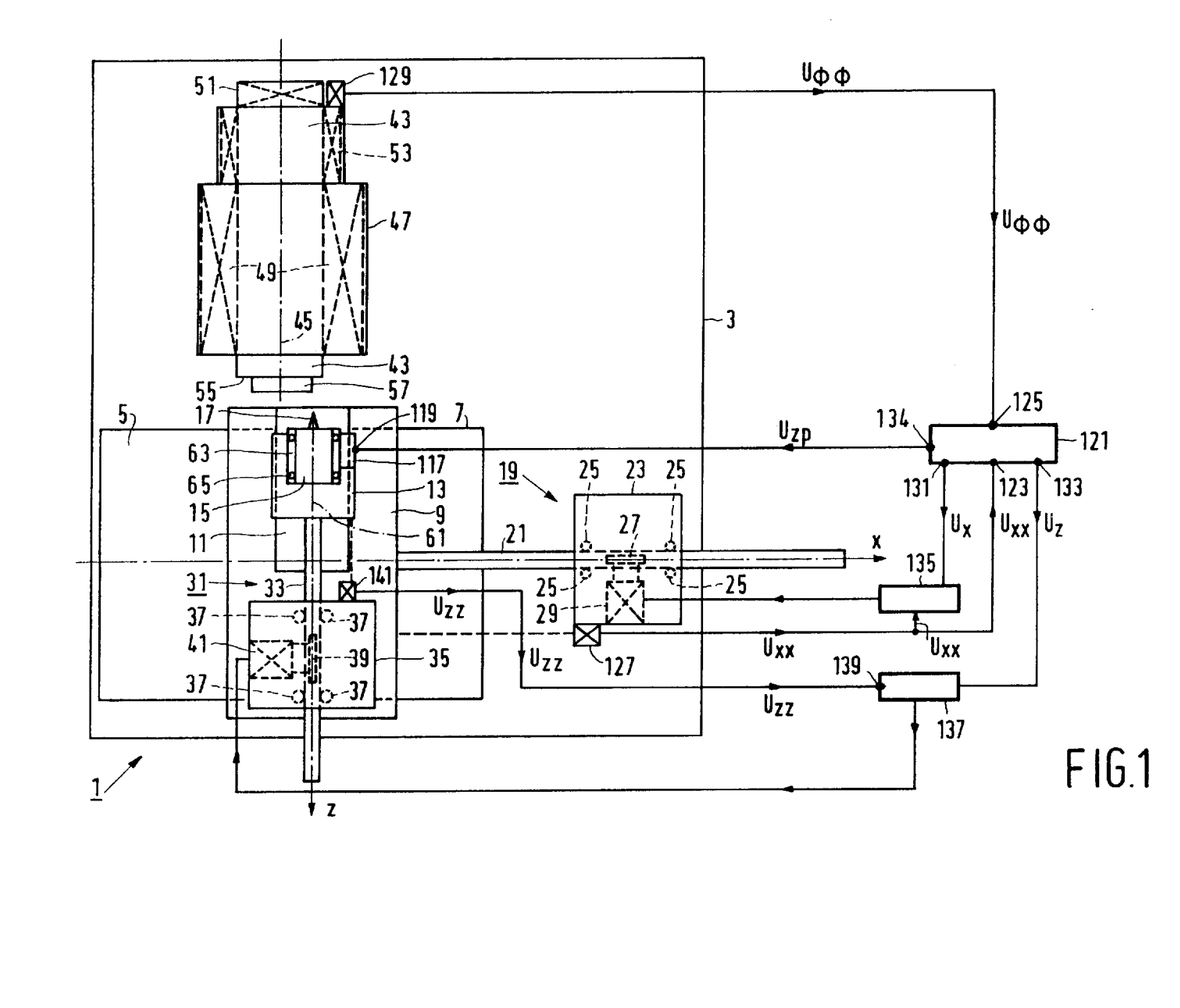
FIG. 1 is a diagrammatic plan view of a machine tool for carrying out a method according to the invention.

The machine tool 1 for carrying out a method according to the invention shown in FIG. 1 comprises a frame 3 which can be placed on a base surface. The frame 3 comprises a guide block 5 with a straight guide 7 extending parallel to an X-direction. The machine tool 1 comprises a first slide 9 which is displaceably guided along the guide 7 of the guide block 5 by means of a static fluid bearing not shown in FIG. 1. The first slide 9 comprises a straight guide 11 extending parallel to a Z-direction which is perpendicular to the X-direction. A second slide 13 is displaceably guided along the guide 11 of the first slide 9 by means of a static fluid bearing which is also not shown in FIG. 1. A positioning device 15 of the machine tool 1 is fastened on the second slide 13, which positioning device is to be described further below and by which positioning device a tool such as, for example, a cutting tool 17 can be displaced relative to the second slide 13 in a manner which is also to be described further below.

The first slide 9 is displaceable along the guide 7 of the guide block 5 by means of a drive unit 19, so that the positioning device 15 with the cutting tool 17 is displaceable relative to the frame 3 parallel to the X-direction. The drive unit 19 comprises a drive rod 21 which extends parallel to the X-direction, is coupled to the first slide 9, and is guided in a housing 23 fastened to the frame 3 by means of a number of guide wheels 25 which are shown diagrammatically only in FIG. 1. A friction wheel 27 journaled in the housing 23 and driven by an electric motor 29 arranged in the housing 23 bears with pretension on the drive rod 21. so that the first slide 9 is displaceable parallel to the X-direction via the drive rod 21 and the friction wheel 27 by means of the motor 29. The second slide 13 is displaceable along the guide 11 of the first slide 9 by means of a drive unit 31, so that the positioning device 15 with the cutting tool 17 is displaceable relative to the first slide 9 parallel to the Z-direction. The drive unit 31 comprises a drive rod 33 which extends parallel to the Z-direction, which is coupled to the second slide 13, and which is guided in a housing 35 fastened to the first slide 9 by means of a number of guide wheels 37. A friction wheel 39 journaled in the housing 35 arid driven by an electric motor 41 arranged in the housing 35 bears with pretension on the drive rod 33. The second slide 13 is thus displaceable parallel to the Z-direction via the drive rod 33 and the friction wheel 39 by means of the motor 41.

As FIG. 1 further shows, the machine tool 1 comprises a spindle 43 which extends parallel to the Z-direction and is rotatable about an axis of rotation 45 directed parallel to the Z-direction. The spindle 43 is journaled in a bearing block 47 of the frame 3 and is supported perpendicularly to the Z-direction by means of a radial static fluid bearing 49 and is supported parallel to the Z-direction by means of an axial static fluid bearing 51. The spindle 43 can be rotated by means of an electric motor 53 which is depicted diagrammatically only in FIG. 1. The spindle 43 is provided with a support 57 for a workpiece to be processed by means of the machine tool 1 adjacent an end 55 facing the positioning device 15. The support 57 is, for example, a three-jaw chuck which is usual and known per se.

Figure 2:
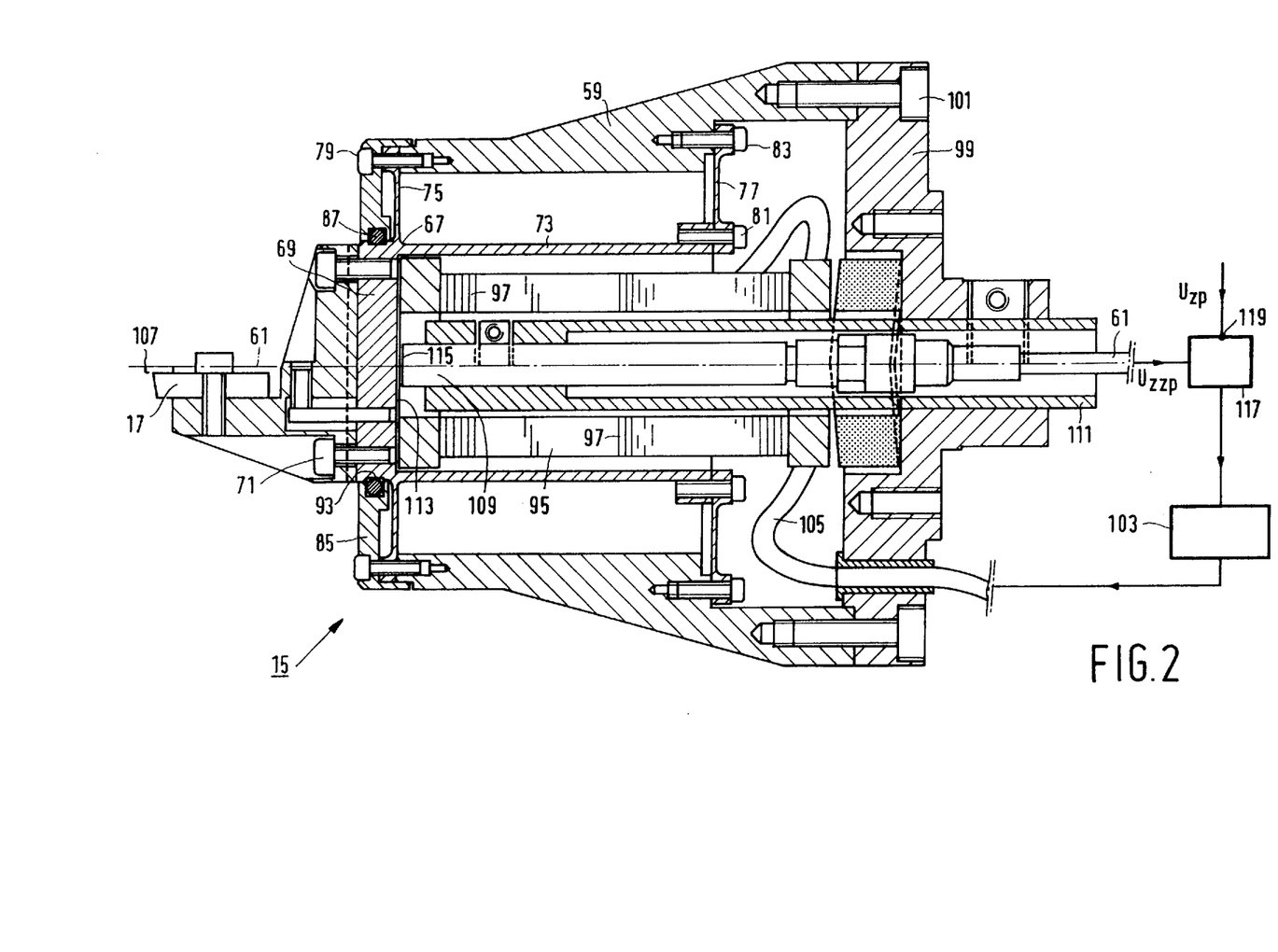
FIG. 2 is a cross-section of a positioning device of the machine tool of FIG. 1.

The positioning device 15 of the machine tool 1 is shown in cross-section in FIG. 2. As FIG. 2 shows, the positioning device 15 comprises a substantially rotationally symmetrical housing 59 with a centerline 61. It is visible in FIG. 1 that the housing 59 is provided with a foot 63 which can be fastened on the second slide 13 by means of a screw connection 65. In the assembly of the machine tool 1 shown in FIG. 1, the housing 59 of the positioning device 15 is fastened on the second slide 13 such that the centerline 61 of the housing 59 extends parallel to the Z-direction and to the axis of rotation 45 of the spindle 43, As FIG. 2 further shows, the positioning device 15 comprises a tool holder 67 on which the cutting tool 17 can be fastened. As FIG. 2 shows, the tool holder 67 comprises a mounting plate 69 which extends perpendicularly to the centerline 61 and on which the cutting tool 17 can be fastened by means of a screw connection 71, and a coupling bush 73 arranged concentrically with the centerline 61. The coupling bush 73 is suspended in the housing 59 by means of two parallel, annular membranes 75, 77 extending perpendicularly to the centerline 61 and having a common centerline which coincides with the centerline 61 of the housing 59. The membranes 75, 77 are comparatively stiff in directions perpendicular to the centerline 61 and are elastically deformable in a direction parallel to the centerline 61. The membrane 75 present adjacent an end of the coupling bush 73 facing the mounting plate 69 is formed integrally with the coupling bush 73 and is fastened to the housing 59 by means of a screw connection 79. The membrane 77 present adjacent the other end of the coupling bush 73 is fastened to the coupling bush 73 by means of a screw connection 81 and to the housing 59 by means of a further screw connection 83. The screw connection 79 is also used for fastening an annular cover plate 85 extending perpendicularly to the centerline 61 to the housing 59. An O-ring 87 is provided in an annular groove 89 in an inner rim 91 of the cover plate 85. The O-ring 87 bears with pretension on an outer rim 93 of the mounting plate 69, so that an interior space of the housing 59 is protected against pollution such as, for example, metal particles or lubricant.

As FIG. 2 further shows, a laminated piezoelectric actuator 95 is positioned inside the coupling bush 73. The piezoelectric actuator 95 is bush-shaped and arranged concentrically with the centerline 61 The laminated piezoelectric actuator 95 comprises a stack of annular piezoelectric elements 97 which are usual and known per se and which extend perpendicularly to the centerline 61. The piezoelectric actuator 95 is fastened and clamped in between the mounting plate 69 and a rear wall 99 of the housing 59 which is fastened to the housing 59 by means of a screw connection 101. The piezoelectric elements 97 can be activated by means of a controllable voltage source 103 which is connected to the piezoelectric elements 97 via an electrical connection 105. The piezoelectric elements 97 have a thickness parallel to the centerline 61 which increases upon activation of the piezoelectric elements 97. The piezoelectric actuator 95 accordingly has a length parallel to the centerline 61 which increases when the piezoelectric elements 97 are activated. Since the piezoelectric actuator 95 is clamped in between the mounting plate 69 and the ear wall 99, and tie mounting plate 69 is suspended in the housing 59 by means of the membranes 75, 77 which are elastically deformable parallel to the centerline 61. the mounting plate 69 with the cutting tool 17 is displaced parallel to the centerline 61 owing to the activation of die piezoelectric elements 97. A point of operation 107 of the cutting tool 17 situated on the centerline 61 is displaced along the centerline 61 when the piezoelectric elements 97 are activated. The annular piezoelectric elements 97 are circumferentially uniformly activated, so that the increase in the thickness of the piezoelectric elements 97 caused by the activation of the piezoelectric elements 97 is uniform along their circumference.

The piezoelectric actuator 95 thus exerts a force on the mounting plate 69 with the cutting tool 17 upon activation of the piezoelectric elements 97 which has a line of force coinciding with the centerline 61.

As FIG. 2 further shows, an inductive position sensor 109 which is usual and known per se is positioned within the bush-shaped piezoelectric actuator 95. The position sensor 109 is mounted in a sleeve 111 which is fastened to the rear wall 99 of the housing 59. A distance between a rear surface 113 of the mounting plate 69 of the cutting tool 17 and a front surface 115 of the position sensor 109 is measured by the position sensor 109. As FIG. 2 shows, the position sensor 109 supplies an electrical signal $u_{ZZP}$ to an electric controller 117 of the positioning device 15. The signal $u_{ZZP}$ has a value which is determined by the position measured by the position sensor 109. The electrical controller 117 is a feedback controller of a kind usual and known per se which controls the voltage source 103 of the piezoelectric actuator 95 such that the point of operation 107 of the cutting tool 17 is displaced by die piezoelectric actuator 95 into consecutive positions on the centerline 61 as desired by an operator of the machine tool 1. The controller 117 is also depicted in FIG. 1 and has an electrical input 119 for receiving an electrical signal $u_{ZP}$ whose value is determined by a desired position of the point of operation 107 on the centerline 61 of the positioning device 15. As FIG. 1 shows, the electrical signal $u_{ZP}$ is supplied by an electrical control unit 121 which can be programmed by the operator of the machine tool 1. The control unit 121 has a first electrical input 123 for receiving an electrical signal $u_{XX}$, and a second electrical input 125 for receiving an electrical signal $u_{\phi\phi}$. The electrical signal $u_{XX}$ is supplied by an optical position sensor 127 which is usual and known per se and by which an X-position of the first slide 9 with die positioning device 15 is measured, while the electrical signal $u_{\phi\phi}$ is supplied by an angle sensor 129 which is usual and known per se and which measures an angle of rotation $\phi$ of the spindle 43. The control unit 121 has a first electrical output 131 for supplying an electrical signal $u_X$, a second electrical output 133 for supplying an electrical signal $u_Z$, and a third electrical output 134 supplying said electrical signal $u_{ZP}$. The signals $u_X$ and $u_Z$ correspond to a desired X-position of the first slide 9 and a desired Z-position of the second slide 13, respectively. The signal $u_X$ is supplied to a further feedback controller 135 which is usual and known per se and which has said signal $u_{XX}$ as its input signal, and which drives the electric motor 29 of the drive unit 19 of the first slide 9 such that the measured X-position of tie first slide 9 is equal to the desired X-position. The signal $u_Z$ is supplied to a further feedback controller 137 which is usual and known per se and which has an electrical input 139 for receiving an electrical signal $u_{ZZ}$. The signal $u_{ZZ}$ is supplied by an optical position sensor 141 which is usual and known per se and which measures a Z-position of the second slide 13 with the positioning device 15. The controller 137 controls the electric motor 41 of the drive unit 31 of the second slide 13 such that the measured Z-position of the second slide 13 is equal to the desired Z-position. In accordance with a program to be put in by the user of the machine tool 1, the control unit 121 determines the signal $u_X$ as a function of the time t which has elapsed during an operation, the signal $u_Z$ as a function of the measured X-position, and the signal $u_{ZP}$ as a function of the measured X-position and the measured angle of rotation $\phi$, so that $u_X=u_X(t)$, $u_Z=u_Z(u_{XX})$, and $u_{ZP}=u_{ZP}(u_{XX},u_{\phi\phi})$. In this manner a workpiece is given a basic surface by means of the machine tool 1 as a result of a suitable control of the first slide 9 and the second slide 13 and is given a structure superimposed on the basic surface which is asymmetrical relative to the axis of rotation 45 owing to a suitable control of the positioning device 15.

Figure 3A:
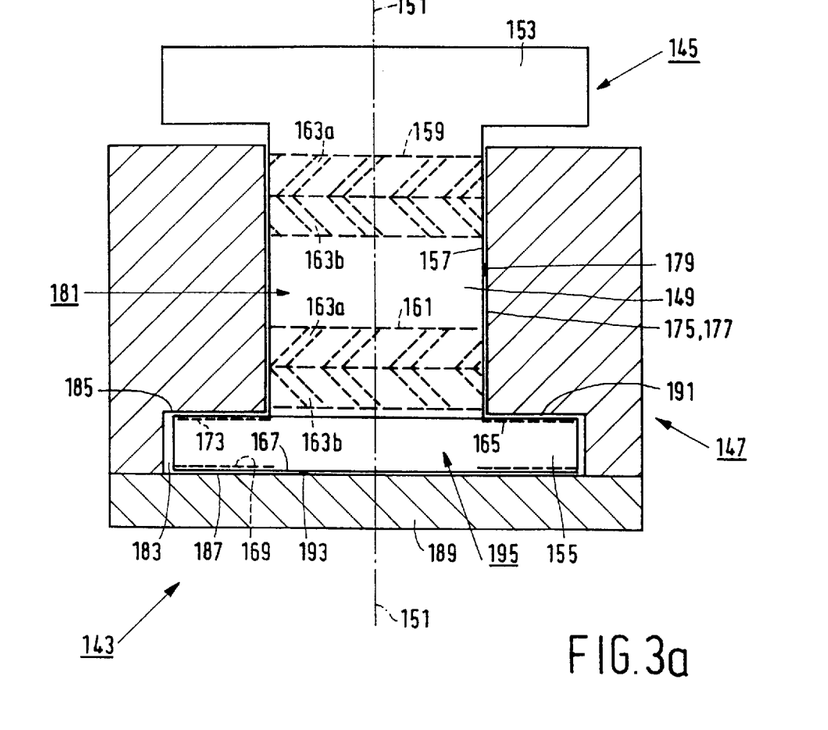
FIG. 3a is a cross-section of a dynamic groove bearing manufactured by a method according to the invention.
Figure 3B:
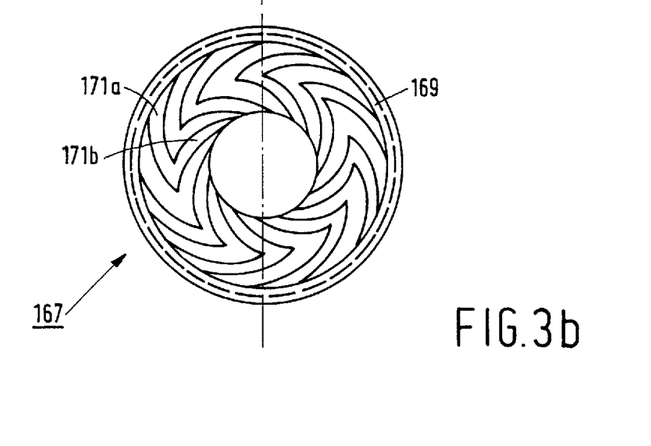

The machine tool 1 is used for the manufacture of a dynamic groove bearing by a method according to the invention to be described below. FIG. 3a diagrammatically shows such a dynamic groove bearing 143 in cross-section. The dynamic groove bearing 143 has an inner bearing pan 145 which is rotatable in an outer bearing part 147. The inner bearing part 145 has a central shaft 149 with a centerline 151, a mounting disc 153 formed integrally with the shaft 149, and arranged concentrically with the centerline 151, and a bearing disc 155 which is also arranged concentrically with the centerline 151 and is fastened to the shaft 149. The central shaft 149 has a circular-cylindrical outer wall 157 on which a first pattern of grooves 159 and a second pattern of grooves 161 are present axially spaced apart from one another. The patterns of grooves 159 and 161 are both herringbone-shaped and each have a number of consecutive pairs of grooves 163a, 163b arranged in a V-shape and provided at equal interspacings. The bearing disc 155 has two parallel annular bearing surfaces 165, 167 which extend perpendicularly to the centerline 151 FIG. 3b shows the bearing surface 167 of the bearing disc 155 of the inner bearing part 145 in elevation. As FIG. 3b shows, a pattern of grooves 169, also herringbone-shaped, is present on the bearing surface 167 with a number of consecutive pairs of grooves 171a, 171b which are arranged in a V-shape with regular interspacings. Furthermore, a pattern of grooves 173 corresponding to the pattern of grooves 169 on the bearing surface 167 is present on the bearing surface 165. The outer bearing part 147 has a circular-cylindrical through hole 175 with a smooth inner wall 177. A bearing gap 179 is present between the inner wall 177 of the outer bearing part 147 and the outer wall 157 of the central shaft 149 of the inner bearing part 145, The patterns of grooves 159 and 161 on the central shaft 149 in combination with the smooth inner wall 177 of the outer bearing part 147 form a radial dynamic groove bearing 181 by means of which the inner bearing part 145 is journaled relative to the outer bearing part 147 in a direction perpendicular to the centerline 151. The outer bearing part 147 further comprises a chamber 183 which is bounded by an annular, smooth bearing surface 185 extending perpendicularly to the centerline 151 and by a smooth bearing surface 187 also extending perpendicularly to the centerline 151. As FIG. 3a shows, the bearing surface 187 is provided on a closing plate 189 which is fastened to the outer bearing part 147 and closes off the chamber 183. A bearing gap 191 is present between the bearing surface 165 of the inner bearing part 145 and the bearing surface 185 of the outer bearing part 147, while a bearing gap 193 is present between the bearing surface 167 of the inner bearing part 145 and the bearing surface 187 of the outer bearing part 147. The patterns of grooves 173 and 169 on the bearing disc 155 of the inner bearing part 145 in combination with the smooth bearing surfaces 185 and 187 of the outer bearing part 147 form an axial dynamic groove bearing 195 by means of which the inner bearing part 145 is journaled relative to the outer bearing part 147 in a direction parallel to the centerline 151.

Figure 3C:
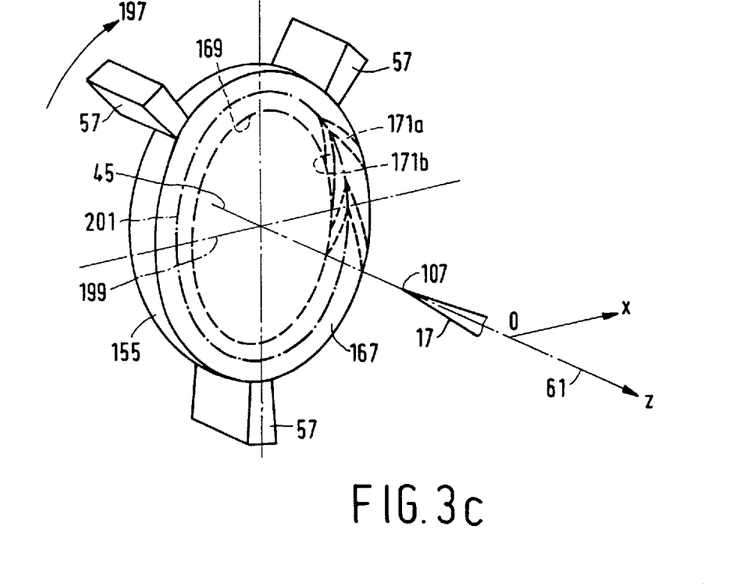
FIG. 3c shows how the groove pattern is provided in the inner bearing part of FIG. 3b by a method according to the invention.

FIG. 3c shows how the bearing disc 155 of the inner bearing part 145 of the dynamic groove bearing 143 is given the pattern of grooves 169 by the machine tool 1 in accordance with a method according to the invention. The bearing disc 155 is for this purpose fastened to the support 57, the bearing surface 167 to be processed extending perpendicularly to the axis of rotation 45 of the spindle 43. As FIG. 3c shows, the centerline 61 of the positioning device 15 coincides with the axis of rotation 45 of the spindle 43 when the positioning device 15 is in a position X=0. The pattern of grooves 169 to be provided on the bearing surface 167, with the individual grooves 171a, 171b, is partly indicated in FIG. 3c by means of broken lines. In the method according to the invention, the support 57 with the bearing disc 155 to be processed is rotated in a constant direction such as, for example, the direction indicated wit an arrow 197 in FIG. 3c, First the bearing surface 167 is made smooth in the method, for which purpose the point of operation 107 of the cutting tool 17 is displaced along the bearing surface 167 parallel to the X-direction in accordance with a radius 199 shown in FIG. 3c. The signal $u_{ZP}$ is zero here, so that the cutting tool 17 is in a constant position relative to the second slide 13. Subsequently, the point of operation 107 of the cutting tool 17 is once more displaced over the bearing surface 167 along radius 199. Since the support 57 with the bearing disc 155 is rotated in a constant direction, and the cutting tool 17 is displaced along radius 199, the point of operation 107 of the cutting tool 17 is displaced relative to the bearing disc 155 along a circular path whose radius gradually increases. A portion 201 of such a circular path is shown with a broken line in FIG. 3C, where it can be seen that the path 201 crosses the individual grooves 171 of the pattern of grooves 169 to be provided one after the other. In the method according to the invention, the control unit 121 of the machine tool 1 is programmed such that the cutting tool 17 when crossing the consecutive grooves 171 to be provided carries out a short chiselling movement parallel to the Z-direction relative to the second slide 13 each time. Thus a small portion of each individual groove 171 is processed by the cutting tool 17 whenever it passes the relevant individual groove 171. Depending on the value of a desired depth of the grooves 171, the desired depth of the relevant portion of each individual groove 171 is reached already during the first passage of the cutting tool 17, or the cutting tool 17 has to be displaced a number of times along the radius 199, during which the individual grooves 171 are made deeper each time. The cutting tool 17 is thus periodically displaced parallel to the Z-direction relative to the bearing disc 155 to be processed by means of the positioning device 15 with a frequency which is determined by a product of a rotation frequency of the support 57 and a number of grooves 171 to be provided on the bearing surface 167 of the bearing disc 155. If, for example, the rotation frequency of the support 57 in the embodiment shown in FIG. 3c is 1,000 rpm (16.67 Hz), and the number of pairs of grooves 171a, 171b is, for example, 36, the required frequency of the periodic movement of the cutting tool accordingly is 17,600 Hz. The grooves 171 are simultaneously formed in a comparatively short time in this manner during the rotation of the support 57. If the bearing disc 155 in the embodiment shown in FIG. 3c has a diameter of 30 mm, a processing time of no more than approximately 4 minutes is required.

Since the smooth basic surface of the bearing surface 167 is provided in that the cutting tool 17 is displaced by means of the first slide 9 and the second slide 13, while the pattern of grooves 169 is provided in that the cutting tool 17 is displaced by means of the positioning device 15 the positioning device 15 need perform a movement of only a comparatively small amplitude only which is determined by the desired depth of the grooves 171, for example, a few tens of micrometers. The depth of the grooves 171 being comparatively small, comparatively high frequencies are achievable for the periodic movement of the cutting tool 17. Since the frequency of the periodic movement of the cutting tool 17 is determined by the product of the rotation frequency of the support 57 and the number of grooves 171 to be provided, the method according to the invention is capable of achieving a high rotation frequency of the support 57 and accordingly a short processing time. Furthermore, the high rotation frequency of the support 57 leads to a comparatively high cutting speed of the cutting tool 17, so that a good surface quality of the bearing surface 167 and the grooves 171 is achieved, and an aftertreatment of the bearing surface 167 will in general not be necessary.

The positioning device 15 with the laminated piezoelectric actuator 95 is highly suitable for generating displacements of the cutting tool 17 with a comparatively high frequency and a comparatively small amplitude as described above. The displacements generated by the piezoelectric actuator 95 are highly accurate and can be readily controlled. Both the bearing surface 167 and the grooves 171 as a result have an accurate shape. Since the tool holder 67 is fastened to the housing 59 of the positioning device 15 by means of the membranes 75, 77 whose centerline coincides with the line of force of the piezoelectric actuator 95, the fastening of the actuator 95 in a direction perpendicular to the centerline 61 of the positioning device 15 is particularly stiff. This means that the line of force of the actuator 95 coincides with the centerline 61 of the positioning device 15 in all achievable positions of the cutting tool 17, so that the point of operation 107 of the cutting tool 17 remains accurately on the centerline 61 in spite of the occurrence of machining forces. The construction of the positioning device 15 with the mutually concentrically positioned coupling bush 73, piezoelectric actuator 95, sleeve 111, and position sensor 109 is particularly compact. The position of the cutting tool 17 is measured very closely to the point of operation 107 because the position sensor 109 measures the distance between the rear surface 113 of the mounting plate 69 of the cutting tool 17 and the front surface 115 of the position sensor 109. The measurement is accordingly not influenced by deformations of the piezoelectric actuator 95 or the coupling bush 73, and as a result is particularly accurate.

Figure 3D:
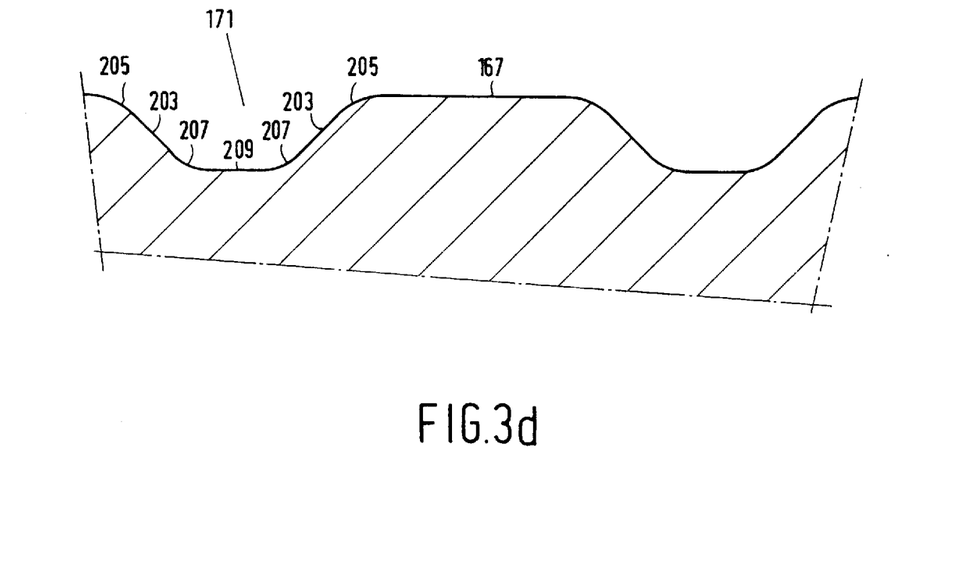
FIG. 3d is a cross-section of a number of individual grooves of the groove pattern of the inner bearing part of FIG. 3b.

FIG. 3d shows that the cross-section of the grooves 171 of the bearing disc 155 manufactured by the method according to the invention has an undulating shape. Since the forces exerted by the piezoelectric actuator 95 on the cutting tool 17 are of a limited value the position of the cutting tool 17 relative to the bearing surface 167 will in general change gradually when the cutting tool 17 passes a groove 171 to be made during a single cycle of its periodic movement. As a result, the grooves 171 have side walls 203 which are sloping relative to the bearing surface 167, while the side walls 203 merge into the bearing surface 167 and into a bottom 209 of a groove 171 via fluent transitions 205 and 207 without sharp angles. The shape of the cross-section of the grooves 171 is determined by the change in the position of the cutting tool 17 relative to ace bearing surface 167 during a single cycle in the period movement of the cutting tool 17. Since the change in said position is programmable by the user of the machine tool 1, dynamic groove bearings can be manufactured by the method according to the invention which have, for example, grooves of different cross-sections, or grooves having cross-sections which are not constant. It was further found that the fluent transitions 205 between the side walls 203 of the grooves 171 and the bearing surface 167 lead to a comparatively quick pressure build-up in the bearing gaps 191 and 193 between the bearing surfaces 165 and 185 and the bearing surfaces 167 and 187, respectively, of the dynamic groove bearing 143 during starting of the latter. As a result, the bearing surfaces 165 and 185 and the bearing surfaces 167 and 187 become detached from one another at a comparatively low speed already during starting of the dynamic groove bearing 143, so that wear of the bearing surfaces 165, 167, 185, 187 owing to mechanical friction during starting is limited as much as possible.

Figure 3E:
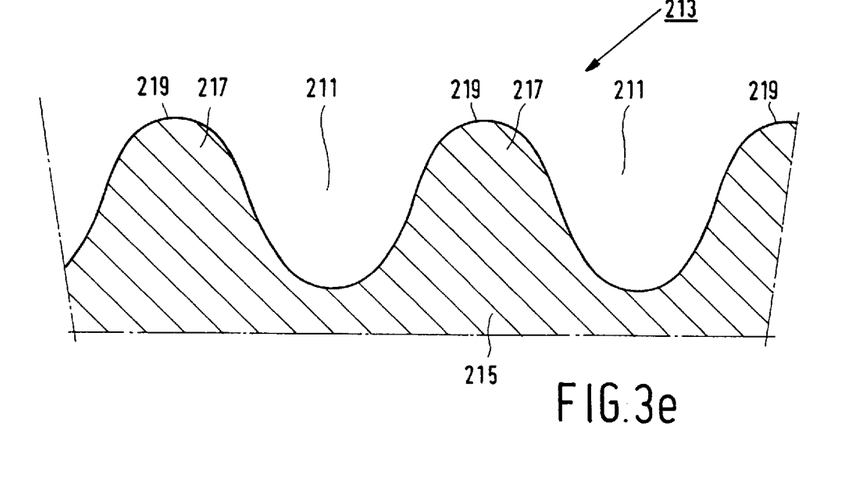
FIG. 3e is a cross-section of a number of individual grooves of an alternative groove pattern of the inner bearing part of FIG. 3b, FIG. 4a diagrammatically shows a data storage unit provided with two dynamic groove bearings manufactured by a method according to the invention.

Fig. 3e is a cross-section of a number of grooves 211 of an alternative pattern of grooves 213 for the bearing disc 155 of the dynamic groove bearing 143 shown in FIG. 3a. This cross-section is achieved in that the cutting tool 17 is periodically displaced parallel to the Z-direction in a sinusoidal movement by means of the positioning device 15. The bearing disc 155 in this embodiment has a bearing surface 215 with a sinusoidal cross-section seen in circumferential direction, the grooves 211 in combination with lands 217 situated between the grooves 211 having a sinusoidal cross-section. Since a sinusoidal movement in which no second and higher harmonic movement components occur is the simplest periodic movement which can be carried out by the cut tool 17, the driving forces of the piezoelectric actuator 95 necessary for tis movement of the cutting tool 17 are a minimum. Accordingly, a comparatively high frequency of the periodic movement of the cutting cool 17 is achievable in the case of a sinusoidal movement of the cutting tool 17, so that given a certain rotation frequency of the support 57 a maximum number of grooves can be provided in the bearing surface 215. Since the displacements generated by the piezoelectric actuator 95 are very accurate, it is achieved that the crests 219 of the lands 217 have mutually substantially equal heights. The risk of mechanical contact between the crests 219 and the opposed bearing surface 187 is very small as a result, which means that a comparatively small height of the bearing gaps 191 and 193 can be used, so that the dynamic groove bearing 143 is very stiff in axial direction.

Figure 4A:
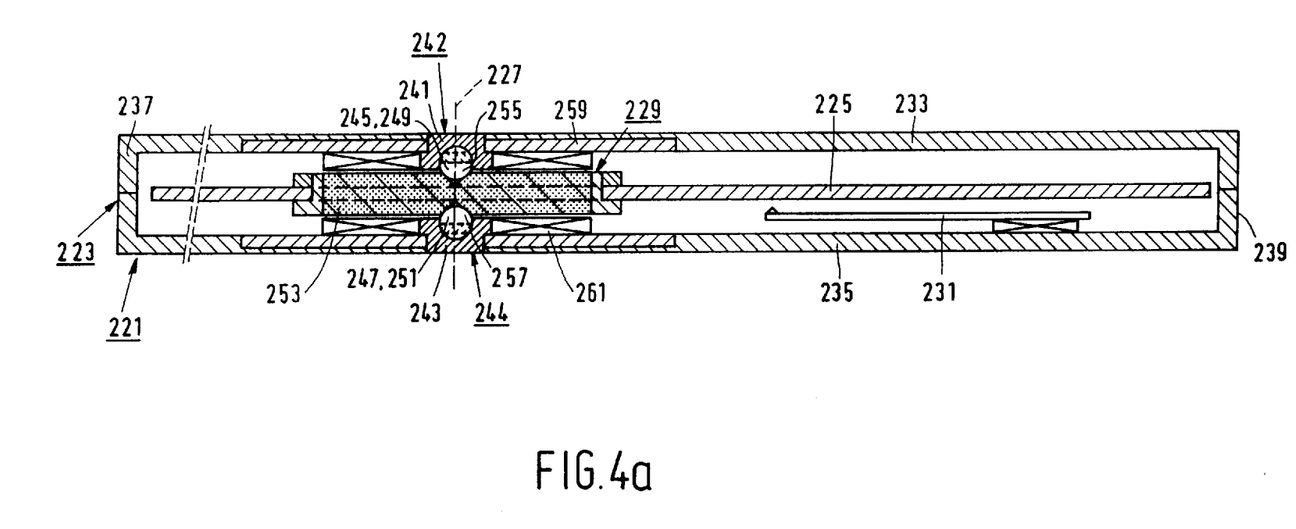

FIG. 4a shows a data storage unit 221 with a cassette-type housing 223 in which an information disc 225 is rotatable about an axis of rotation 227 by means of an electrical drive unit 229. The information disc 225 is, for example, a so-called hard disk with a magnetic layer in which information can be stored or from which information can be read by means of a scanning unit 231 which is diagrammatically shown. The cassette-type housing 223 comprises two main walls 233 and 235 extending parallel to and on either side of the information disc 225, and four side walls interconnecting the two main walls 233, 235. Only two side walls 237 and 239 are visible in FIG. 4a. An outer bearing part 241, 243 is fastened to each main wall 233, 235 of the housing 223. The outer bearing parts 241, 243 are arranged opposite one another, seen in the direction of the axis of rotation 227, and are provided with spherical bearing surfaces 245, 247 on which patterns of grooves 249, 251 are provided. The information disc 225 is fastened to a magnetic rotor 253 of the drive unit 229. The rotor 253 is provided with two smooth balls 255 and 257 which together with the outer bearing parts 241 and 243 form two dynamic groove bearings 242, 244 with which the information disc 225 is journaled in the housing 223 in directions perpendicular to and parallel to the axis of rotation 227. The drive unit 229 is further provided with two electric coil systems 259 and 261 which are fastened to the main walls 233 and 235. As will be explained in more detail below, the outer bearing parts 241, 243 of said dynamic groove bearings 242, 244 are manufactured by a method according to the invention. The data storage unit 221 has a compact, light-weight and handy construction of minimum dimensions which is highly suitable for miniaturization. The information disc 225 has a diameter, for example, of a few centimeters, while the housing 223 has a thickness of a few millimeters. The method according to the invention is highly suitable for manufacturing the dynamic groove bearings 242, 244 required in this compact data storage unit because highly accurate displacements of the cutting tool 17 can be generated by the piezoelectric actuator 95, while in addition comparatively short processing times are achievable such as are necessary for mass manufacture of such compact data storage units.

Figure 4B:
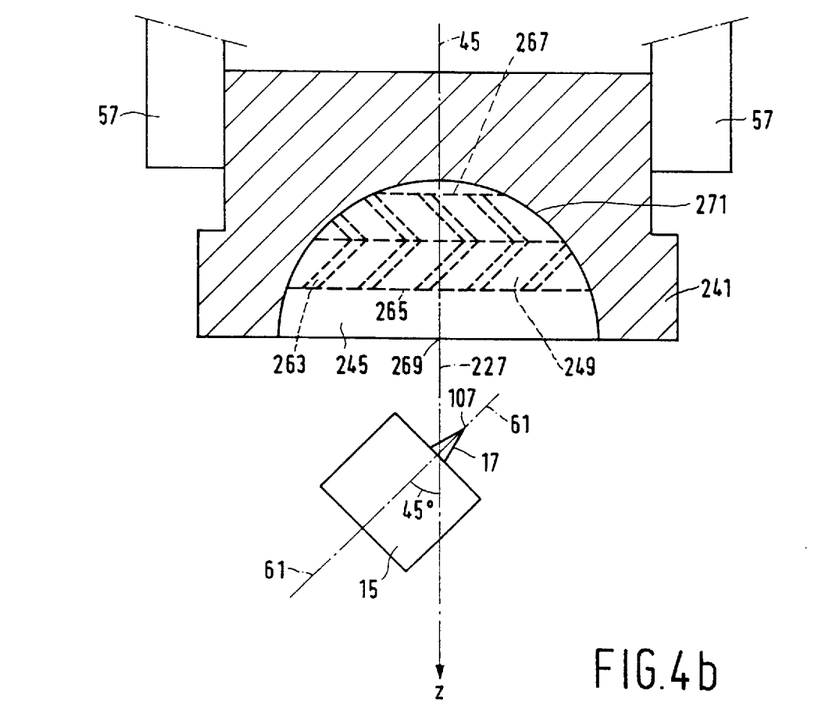
FIG. 4b shows how a groove pattern is provided in an outer bearing part of a dynamic groove bearing of the data storage unit of FIG. 4a by a method according to the invention.

FIG. 4b shows how the pattern of grooves 249 is provided in the outer bearing part 241 of the dynamic groove bearing 242 of the data storage unit 221 by a method according to the invention. The outer bearing part 241 is for this purpose fastened to the support 57 of the machine tool 1, the axis of rotation 227 of the outer bearing part 241 coinciding with the axis of rotation 45 of die spindle 4D. The pattern of grooves 249 to be provided on the spherical bearing surface 245 is indicated in FIG. 4b with broken lines. The pattern of grooves 249 to be provided again comprises a herringbone pattern of grooves 263 arranged in a V-shape. As FIG. 4b shows, the pattern of grooves 249 is present on a sphere segment of the spherical bearing surface 245 which extends between a first circle of latitude 265 and a second circle of latitude 267 of the spherical bearing surface 245, the circles of latitude 265 and 267 lying, for example, at 20° and 70°, respectively, relative to the center 269 of the spherical bearing surface 245. In the method according to the invention, tie outer bearing part 241 is rotated in a constant direction, and the spherical bearing surface 245 is first processed to smoothness. The point of operation 107 of the cutting tool 17 is for this purpose displaced along the bearing surface 245 over a quarter of a circle 271 shown in FIG. 4b by means of suitable displacements of the first slide 9 and the second slide 13, the cutting tool 17 being in a constant position relative to the second slide 13 during this. Subsequently the point of operation 107 of the cutting tool 17 is once more displaced over part of the quarter circle 271 present between the first and the second circle of latitude 265, 267 of the bearing surface 245, during which the pattern of grooves 249 is provided in the bearing surface 245 in a manner corresponding to that described above with reference to Fig. 3c. Since the bearing surface 245 is spherical and the positioning device 15 is fastened on the second slide 13 in a fixed position, the periodic movement of the cutting tool 17, is not directed perpendicularly to the bearing surface 245 everywhere. As FIG. 4b shows, the centerline 61 of the positioning device 15 encloses an angle of approximately 45° with the Z-direction. If the working point 107 of the cutting tool 17 is on the first or second circle of latitude 265, 267, the centerline 61 of the positioning device 15 encloses an angle of approximately 25° with a perpendicular to the bearing surface 245, while the angle enclosed by the centerline 61 and a perpendicular on the bearing surface 245 is smaller than 25° if the working point 107 is between the circles of latitude 265, 267. Since it is possible to machine a surface at an angle of 25° to a perpendicular to the surface by means of a usual tool, such as the cutting tool 17, the entire sphere segment of the bearing surface 245 between the circles of latitude 265 and 267. i.e. a comparatively large portion of the total bearing surface 245, can be machined by the cutting tool 17 in that the position device 15 is arranged at a fixed angle of approximately 45° relative to the axis of rotation 45 of the spindle 43. The machine tool 1 need thus not be fitted with an adjustable φ-slide between the positioning device 15 and the second slide 13. It is noted in this connection that the expression "parallel to a direction transverse to the bearing surface" in claim 1 is meant to refer not only to a direction perpendicular to the bearing surface, as in the embodiment of the bearing disc 155, but also to a direction which encloses an acute angle of, for example, at most 30° with a perpendicular to the bearing surface.

In the embodiments of the method according to the invention discussed above, a bearing disc 155 of an axial dynamic groove bearing 195 and an outer bearing part 241 of a dynamic groove bearing 242 with a combined axial and radial bearing force are manufactured by means of the machine tool 1. It is noted that it is also possible to manufacture a dynamic groove bearing with exclusively a radial bearing force by a method according, to the invention. Thus, for example, the patterns of grooves 159 and 161 may also be provided on the central shaft 149 of the radial dynamic groove bearing 181 shown in FIG. 3a by a method according to the invention. The machine tool 1 may be used for this, with the positioning device 15 with the cutting tool 17 being fastened on the second slide 13 such that the centerline 61 of the positioning device 15 is perpendicular to the axis of rotation 45 of the spindle 43, The bearing disc 155 of the axial dynamic groove bearing 195 mentioned above is an inner bearing part of the groove bearing 195, while the bearing part 241 mentioned above is an outer bearing part of the dynamic groove bearing 242. It may accordingly be noted that both inner and outer bearing parts of dynamic groove bearings may be provided with patterns of grooves by a method according to the invention. It is farther noted that a method according to the invention is capable of providing not only herringbone patterns of grooves as mentioned above, but also grooves with, for example spiraling patterns.

It is further noted that a method according to the invention may be implemented not only with the machine tool 1 but also with different machine tools. An example is a machine tool in which the mutual periodic movement of the bearing part to be manufactured and the tool is achieved by a periodic movement of the support of the bearing part to be manufactured. Furthermore, the piezoelectric actuator 95 in the positioning device 15 of the cutting tool 17 may be replaced by a different actuator, for example, an electromagnetic actuator with an electric coil system fastened to the housing 59 of the positioning device 15 and a magnet fastened to the tool holder 67.

In the embodiments described above, the plane bearing surface 167 of the bearing disc 155 and the spherical bearing surface 245 of the outer bearing part 241 are processed by a method according to the invention. It is noted that bearing surfaces of other shapes may also be provided with groove patterns by a method according to the invention. An example which may be mentioned is a conical bearing surface of a dynamic groove bearing with a combined axial and radial bearing action. The centerline 61 of the positioning device 15 in this case should enclose an angle with the axis of rotation 45 of the spindle 43 such that the maximum angle enclosed by the periodic movement of the cutting tool 17 and a perpendicular on the bearing surface to be machined is as small as possible. Angles other than 45° between the centerline 61 of the positioning device 15 and me axis of rotation 45 of the spindle are obviously also possible in this case.

It is finally noted that the dynamic groove bearings manufactured by a method according to the invention may be used in devices other than the data storage unit described above. Examples are rotatable scanning units for reading or writing magnetic tapes in magnetic tape units, or rotatable polygon mirrors in laser printers.

We claim:

1. A method of manufacturing a dynamic groove bearing with a first and a second bearing part which are rotatable relative to one another, comprising the steps of:
   I. providing the bearing parts with cooperating bearing surfaces;
   II. engaging a metal-removing tool with the bearing surface of the first bearing part to provide a number of grooves in a groove pattern on the bearing surface of the first part, the engagement of the metal-removing tool comprising the steps of:
      i. fastening the first bearing part to a rotatable support of a machine tool;
      ii. rotating at a rotational frequency the support and the first bearing part fastened thereto in a constant direction; and
      iii. periodically displacing the metal-removing tool and the first bearing part relative to one another along an axis transverse to the bearing surface of the first bearing part with a frequency which is a function of the product of the rotational frequency of the support and the number of grooves to be provided on the bearing surface of the first bearing part.

2. A method as claimed in claim 1, wherein the periodic displacement as a function of time is a sinusoidal function.

3. A method as claimed in claim 2, wherein the bearing parts are provided with spherical bearing surfaces, the metal-removing tool and the first bearing part being periodically displaced relative to one another parallel to a direction which is oblique to an axis of rotation of the support.

4. A method as claimed in claim 3, wherein the metal-removing tool and the first bearing part are periodically displaced relative to one another along an axis transverse to the bearing surface of the first bearing part by way of a laminated piezoelectric actuator.

5. A method as claimed in claim 4, wherein the metal-removing tool is fastened to a tool holder of the positioning device, which tool holder is fastened to a housing of the positioning device by way of two elastically deformable, annular membranes which extend perpendicularly to a line of force of the piezoelectric actuator and which have a common centerline which coincides with the line of force of the piezoelectric actuator.

6. A method as claimed in claim 2, wherein the metal-removing tool and the first bearing part are periodically displaced relative to one another along an axis transverse to the bearing surface of the first bearing part by way of a laminated piezoelectric actuator.

7. A method as claimed in claim 6, wherein the metal-removing tool is fastened to a tool holder of the positioning device, which tool holder is fastened to a housing of the positioning device by way of two elastically deformable, annular membranes which extend perpendicularly to a line of force of the piezoelectric actuator and which have a common centerline which coincides with the line of force of the piezoelectric actuator.

8. A method as claimed in claim 1, wherein the bearing parts are provided with spherical bearing surfaces, the metal-removing tool and the first bearing part being periodically displaced relative to one another along an axis which is oblique to an axis of rotation of the support.

9. A method as claimed in claim 8, wherein the metal-removing tool and the first bearing part are periodically displaced relative to one another along an axis transverse to the bearing surface of the first bearing part by way of a laminated piezoelectric actuator.

10. A method as claimed in claim 9, wherein the metal-removing tool is fastened to a tool holder of the positioning device, which tool holder is fastened to a housing of the positioning device by way of two elastically deformable, annular membranes which extend perpendicular to a line of force of the piezoelectric actuator and which have a common centerline which coincides with the line of force of the piezoelectric actuator.

11. A method as claimed in claim 1, wherein the metal-removing tool and the first bearing part are periodically displaced relative to one another along an axis transverse to the bearing surface of the first bearing part by way of a laminated piezoelectric actuator.

12. A method as claimed in claim 11, wherein the metal-removing tool is fastened to a tool holder of the positioning device, which tool holder is fastened to a housing of the positioning device by way of two elastically deformable, annular membranes which extend perpendicular to a line of force of the piezoelectric actuator and which have a common centerline which coincides with the line of force of the piezoelectric actuator.

13. A method as claimed in claim 12, wherein the membranes are coupled to one another by way of a coupling bush which is concentrically positioned relative to the line of force and which forms part of the tool holder, while the piezoelectric actuator is bush-shaped and positioned concentrically within the coupling bush, an axial position of the metal-removing tool directed parallel to the line of force being measured by a position sensor which is arranged inside the bush-shaped piezoelectric actuator and which detects an axial position of the tool holder directed parallel to the line of force.

* * * * *